United States Patent [19]

Vollberg et al.

[11] Patent Number: 4,653,139
[45] Date of Patent: Mar. 31, 1987

[54] CASTER WITH A PLAIN THRUST BEARING BETWEEN THE WHEEL FRAME AND THE FRAME CARRIER

[75] Inventors: Fritz Vollberg, Wermelskirchen; Lothar Steinhaus, Remscheid, both of Fed. Rep. of Germany

[73] Assignee: Albert Schulte Söhne GmbH & Co., Wermelskirchen, Fed. Rep. of Germany

[21] Appl. No.: 699,795

[22] Filed: Feb. 8, 1985

[30] Foreign Application Priority Data

Feb. 14, 1984 [DE] Fed. Rep. of Germany ....... 3405112

[51] Int. Cl.[4] .............................................. B60B 33/00
[52] U.S. Cl. ..................................... 16/20; 16/35 R; 16/DIG. 27; 384/426
[58] Field of Search ................ 16/18 R, 20, 22, 35 R, 16/DIG. 27; 384/267, 426

[56] References Cited

U.S. PATENT DOCUMENTS

| | | | |
|---|---|---|---|
| 1,821,642 | 9/1931 | Johnson | 16/21 |
| 2,422,892 | 6/1947 | Forbes et al. | 16/35 R |
| 2,544,924 | 3/1951 | Herold | 16/35 R X |
| 2,905,964 | 9/1959 | Hull | 16/20 |
| 3,428,998 | 2/1969 | Craven, Jr. | 16/21 |
| 4,054,964 | 10/1977 | Kaneko | 16/20 |
| 4,085,983 | 4/1978 | Johnson | 16/20 X |

FOREIGN PATENT DOCUMENTS 2935058 3/1981 Fed. Rep. of Germany .
3136262 4/1983 Fed. Rep. of Germany .
3212993 10/1983 Fed. Rep. of Germany .

*Primary Examiner*—Fred Silverberg
*Attorney, Agent, or Firm*—Peter K. Kontler

[57] ABSTRACT

A caster wherein the web of the bifurcated frame for the wheel and the carrier for the frame define a plain thrust bearing which allows the frame to swivel relative to the carrier about an axis extending at right angles to the axis of the wheel. The frame and the carrier have abutting surfaces and are held against axial movement away from each other by a ring-shaped coupling.

6 Claims, 19 Drawing Figures

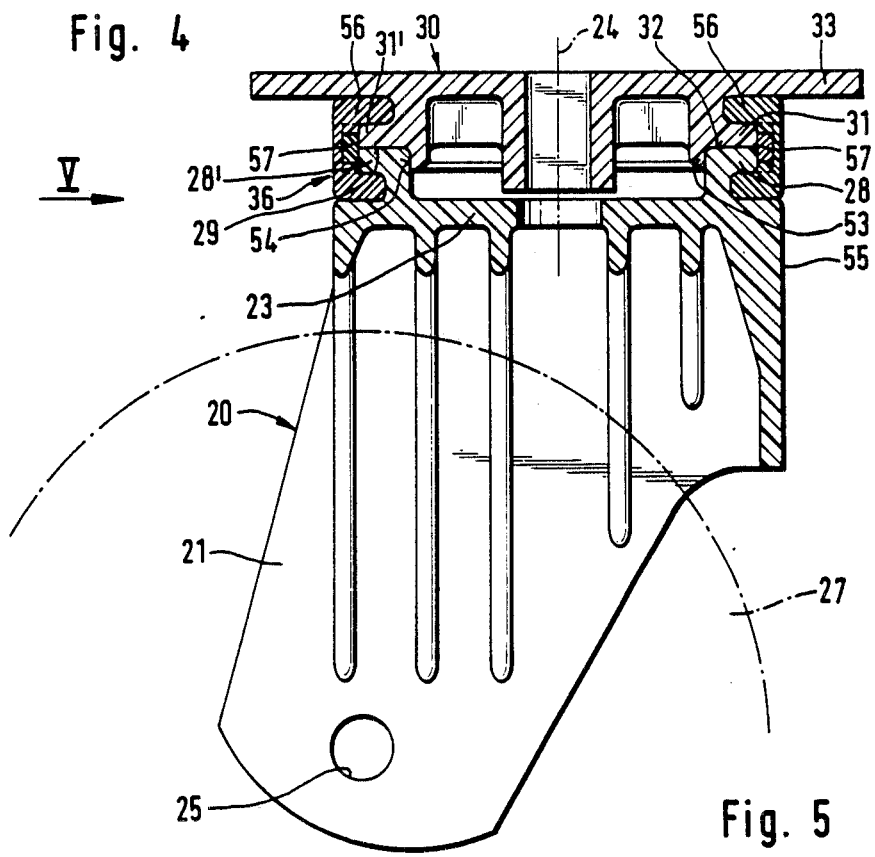
Fig. 4
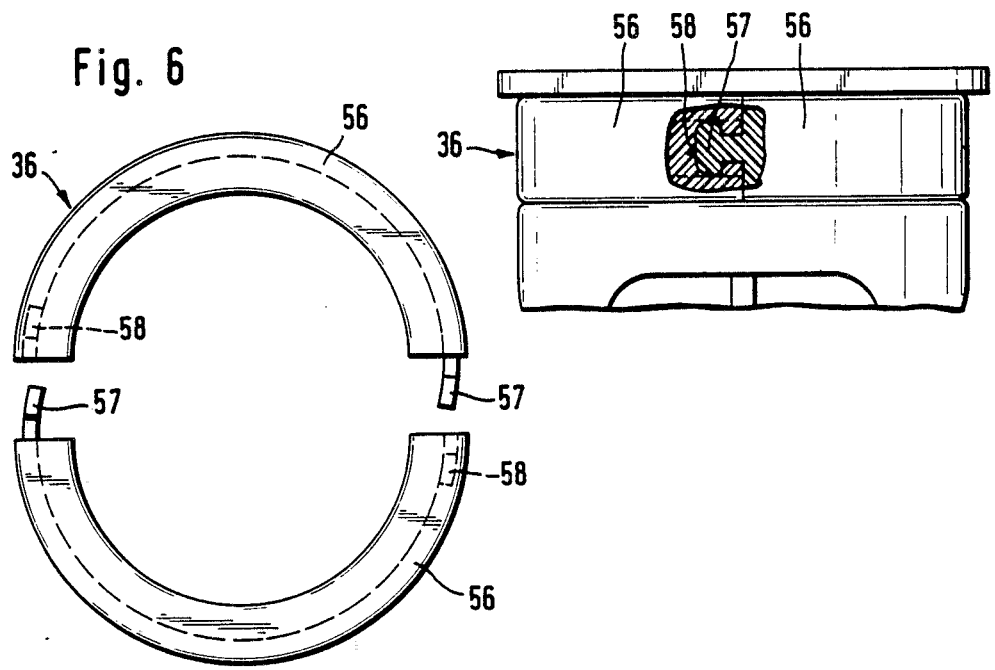
Fig. 5
Fig. 6

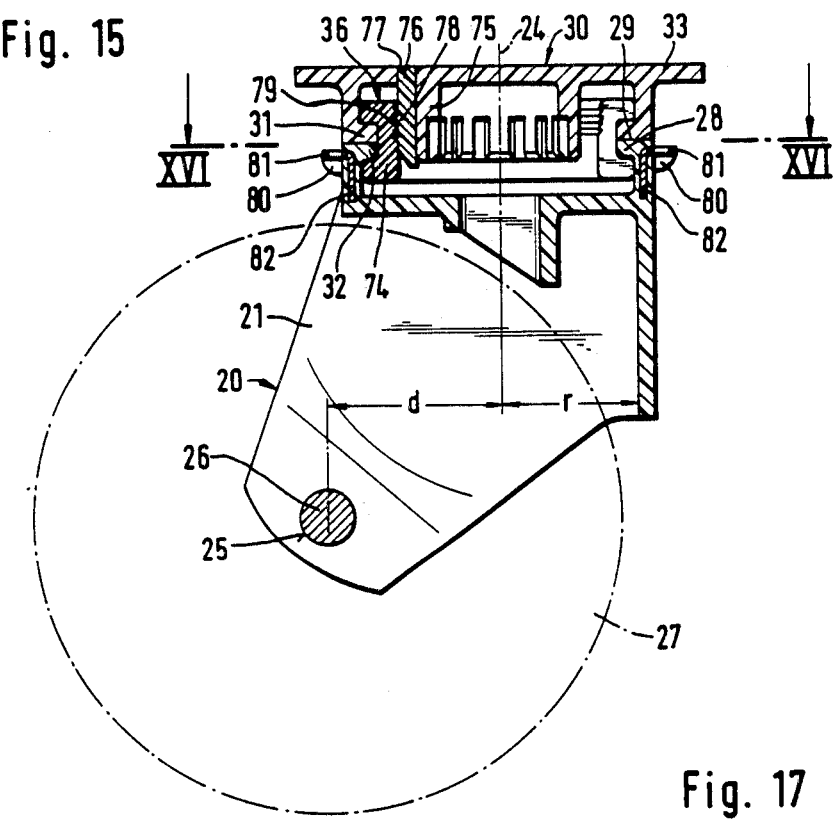
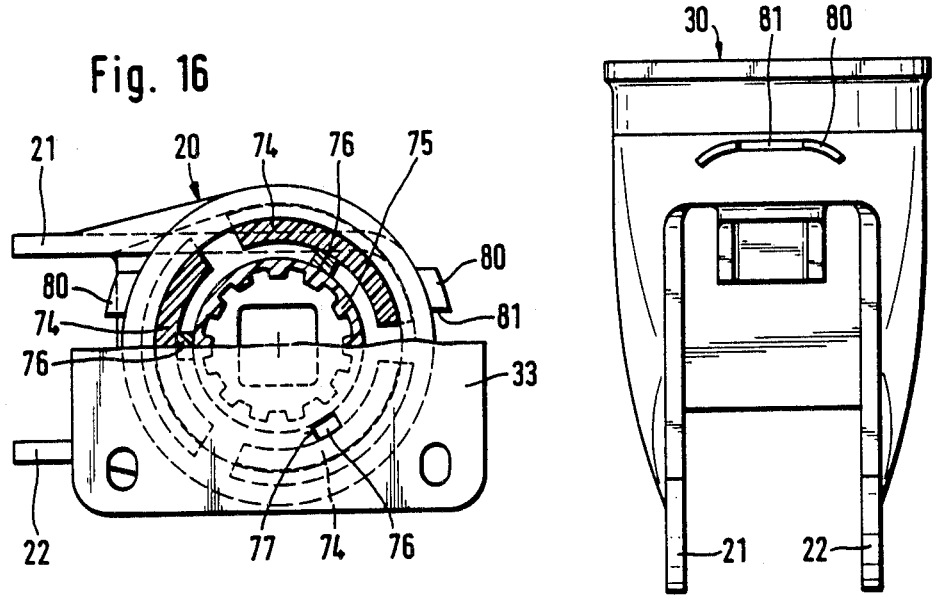

CASTER WITH A PLAIN THRUST BEARING BETWEEN THE WHEEL FRAME AND THE FRAME CARRIER

BACKGROUND OF THE INVENTION

The present invention relates to improvements in casters for use on pieces of furniture, dollies and the like.

German Offenlegungsschrift No. 29 35 058 discloses a caster wherein the prongs which flank and support the wheel form part of a bifurcated frame and such frame further includes a web which connects the two prongs to each other and extends between the upper and lower sections of a bearing defining a swivel axis about which the frame can turn relative to its carrier, e.g., relative to a plate which is affixed to the leg of a table, chair, cabinet or the like. The two sections of the bearing are made of sheet steel and are secured to each other by pressing or by resorting to another material deforming technique. A first annulus of antifriction rolling elements is disposed between the web and the upper section of the bearing, and a second annulus of rolling elements is confined between the web and the lower section of the bearing. The web and the two sections of the bearing are formed with tracks for the respective annuli of rolling elements. Such annuli surround a centrally located passage which is defined in part by the bearing and in part by the frame and serves to receive a shaft around which the frame can swivel when the caster is in use.

German Offenlegungsschrift No. 31 36 262 discloses a caster wherein the web of the frame for the wheel is formed with a centrally located bore for a stub and carries a plate-like member which is affixed to the frame by screws. Such screws extend into radial recesses of the plate-like member and the recesses further receive protuberances which are provided on the web. The plate-like member has an upwardly extending annular marginal portion which defines tracks for upper and lower annuli of spherical antifriction rolling elements which are confined in suitable cages. The upper annulus of rolling elements contacts the annular surface of a connecting plate having a cupped extension projecting below the lower annulus of rolling elements. The just described thrust bearing is held together by projections which are provided on the connecting plate, which extend through holes in the cupped extension and which are bent over to prevent separation of the numerous component parts of the axial thrust bearing from each other.

A drawback of the just described conventional casters is that the thrust bearings between the forked frame and its carrier employ expensive antifriction rolling elements and must be machined with a high degree of precision in order to establish adequate tracks for the rolling elements. Moreover, such conventional thrust bearings consist of large numbers of parts which contributes to the cost and complexity of assembly of the caster. The parts must be made of expensive materials in order to ensure that the caster will be capable of standing long periods of use. As a rule, the parts of such axial bearings must be made of steel or an equivalent alloy even if the casters are not expected to be subjected to pronounced stresses.

OBJECTS AND SUMMARY OF THE INVENTION

An object of the invention is to provide a novel and improved caster wherein the axial or thrust bearing between the frame for the wheel and the carrier for the frame can stand pronounced stresses even though its cost is a small fraction of the cost of heretofore known and utilized thrust bearings.

Another object of the invention is to provide a caster wherein the bearing between the frame and its carrier comprises a small number of simple and inexpensive parts.

A further object of the invention is to provide a caster wherein the parts of the thrust bearing between the frame and its carrier need not be produced and/or finished in grinding, milling or other material removing machines and wherein the weight and bulk of the thrust bearing are small fractions of the weight and bulk of thrust bearings in conventional casters.

An additional object of the invention is to provide a caster wherein the thrust bearing between the frame and its carrier need not employ any spherical and/or otherwise configurated rolling elements.

A further object of the invention is to provide a caster wherein the parts of the thrust bearing between the frame and its carrier can be mass-produced from a synthetic plastic material or from other materials whose cost is much lower than the cost of steel.

Still another object of the invention is to provide the caster with novel and improved means for separably or permanently coupling the frame to its carrier.

A further object of the invention is to provide a caster wherein a portion of the thrust bearing between the frame and its carrier can form an integral part of the structure (such as a piece of furniture or a dolly) on which the caster is mounted.

Another object of the invention is to provide a caster which can stand pronounced stresses in spite of the fact that its thrust bearing does not comprise any antifriction rolling elements.

The improved caster comprises a frame including at least one prong or arm and a connecting portion which is rigid with the prong and has a first surface, a wheel which is mounted on the prong for rotation about a first axis remote from the first surface, a carrier including a supporting portion which has a second surface abutting the first surface, and means for coupling the supporting portion to the connecting portion for angular movement about a second axis which is normal to the first axis so that the two portions form two constituents of a plain thrust bearing acting between the frame and the carrier. The first and second surfaces can be flat, and the caster then further comprises means for centering the supporting and connecting portions. Such centering means can include a substantially annular male centering element and a complementary female centering element. The common axis of the two centering elements coincides with the second axis, one of the centering elements is provided on the carrier, and the other centering element is provided on the frame.

If the two surfaces are not flat or not entirely flat, one of the two portions has an at least substantially annular projection whose axis coincides with the second axis and the other portion has a complementary groove for the projection. One of the two surfaces is then provided on the projection (which can have a triangular or other polygonal cross-sectional outline) and the other surface is provided in the groove.

In accordance with one presently preferred embodiment of the invention, one of the two portions has first detent means and the other portion has a flange which extends substantially radially of the second axis. The coupling means then comprises a ring which overlies the flange and has second detent means complementary to and in engagement with the first detent means to hold the two portions against movement away from each other as considered in the direction of the second axis. The flange can extend radially inwardly toward the second axis and the ring can constitute a split ring having a radially outwardly extending flange which overlies the radially inwardly extending flange. Such split ring is deformable so as to allow for its attachment to and for its separation from the radially inwardly extending flange. The first detent means can comprise protuberances which are provided on the one portion and extend in substantial parallelism with the second axis, and the second detent means then comprises sockets for the protuberances of the first detent means.

The coupling means can comprise a plurality of neighboring arcuate sections each of which has a substantially U-shaped cross-sectional outline and comprises two inwardly extending legs. Each of the two portions is then provided with an external groove receiving one leg of each of the arcuate sections, and such coupling means further comprises means for preferably (but not necessarily) releasably securing the neighboring sections to each other. The just discussed coupling means can comprise two substantially semicircular sections and the securing means can constitute integral parts of such sections.

The portions of the frame and carrier preferably constitute annuli and such annuli can be provided with radially inwardly extending flanges. The coupling means for such portions can comprise a ring having an external circumferential groove for the two flanges. The ring can be provided with a circumferentially complete bead or rim underlying or overlying one of the flanges, a second bead or rim overlying or underlying the other flange, and a hub between the two rims. The hub and the other rim have preferably radially disposed slots so that the diameter of the second rim can be reduced for introduction into the two annuli and subsequent expansion into a position of overlap with the other flange. Alternatively, the two annuli can be provided with radially inwardly extending flanges and the coupling means then comprise a ring which is composed of several arcuate sections and has an external annular groove for the radially inwardly extending flanges. The coupling means then further comprises means for biasing the sections of the ring radially outwardly to prevent their separation from the flanges. The biasing means can comprise a back support (e.g., a tube or cylinder disposed concentrically within the two annuli) which is rigid with one of the two portions and is disposed radially inwardly of the arcuate sections, and wedges which are interposed between the back support and the sections to urge the latter radially outwardly against the flanges. The wedges and the respective arcuate sections can be provided with toothed portions to prevent movement of the wedges in the direction of the second axis.

In accordance with a further embodiment of the invention, only one of the two annular portions is provided with a radially inwardly extending flange and the coupling means then comprises a ring having a substantially L-shaped cross-sectional outline and including a radially outwardly extending leg which overlies the flange. The coupling means then further comprises a bayonet mount which connects the other leg of the ring to the other portion. The bayonet mount can comprise a cylindrical extension which is provided on the other annular portion and has a first set of annularly arranged segments. The ring of the coupling means then comprises a second set of annularly arranged segments which form part of the other leg and engage with the segments of the first set. Such segments can be provided with cooperating male and female detent members (e.g., elastic tongues and complementary grooves) to hold the segments of the two sets against separation from each other.

The coupling means can comprise a first substantially semicircular section which is rigid with one of the two portions and a discrete (separately produced) second semicircular section. The other portion is then provided with a radially outwardly extending flange and the first section has a radially inwardly extending flange which is overlapped by the radially outwardly extending flange. The second section has a substantially U-shaped cross-sectional outline with an internal groove for the flange of the other portion.

The carrier can form an integral part of a mobile commodity, e.g., the carrier can form an integral part of the leg of a piece of furniture which is mounted on two or more casters. Furthermore, one of the two portions can be provided with a substantially annular skirt which surrounds the two surfaces and the other portion is then provided with a recess for the skirt.

In accordance with a presently preferred embodiment of the invention, the two surfaces are annular surfaces and a plane which includes the second axis and is parallel to the first axis is spaced apart from the first axis by a distance which is less than the median radii of the two annular surfaces.

The improved caster can further comprise means for releasably holding the two portions (i.e., the frame and the carrier) against angular movement about the second axis. The holding means can comprise rotation blocking or preventing members which are provided on the frame. Such blocking members can be provided with recesses and can be at least partially embedded in the frame.

The novel features which are considered as characteristic of the invention are set forth in particular in the appended claims. The improved caster itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 4 is a vertical sectional view of a third caster, with the wheel omitted;

FIG. 5 is a view as seen in the direction of arrow V in FIG. 4, with a portion of the carrier broken away;

FIG. 6 is an exploded view of the coupling means in the caster of FIGS. 4 and 5;

FIG. 15 is a vertical sectional view of a seventh caster;

FIG. 16 is a partial plan and partial horizontal sectional view of the seventh caster, the section being taken in the direction of arrows as seen from the line XVI—XVI of FIG. 15;

FIG. 17 is an end elevational view of the frame and carrier as seen from the left-hand side of FIG. 15;

DESCRIPTION OF THE PREFERRED EMBODIMENTS

Figure 1:
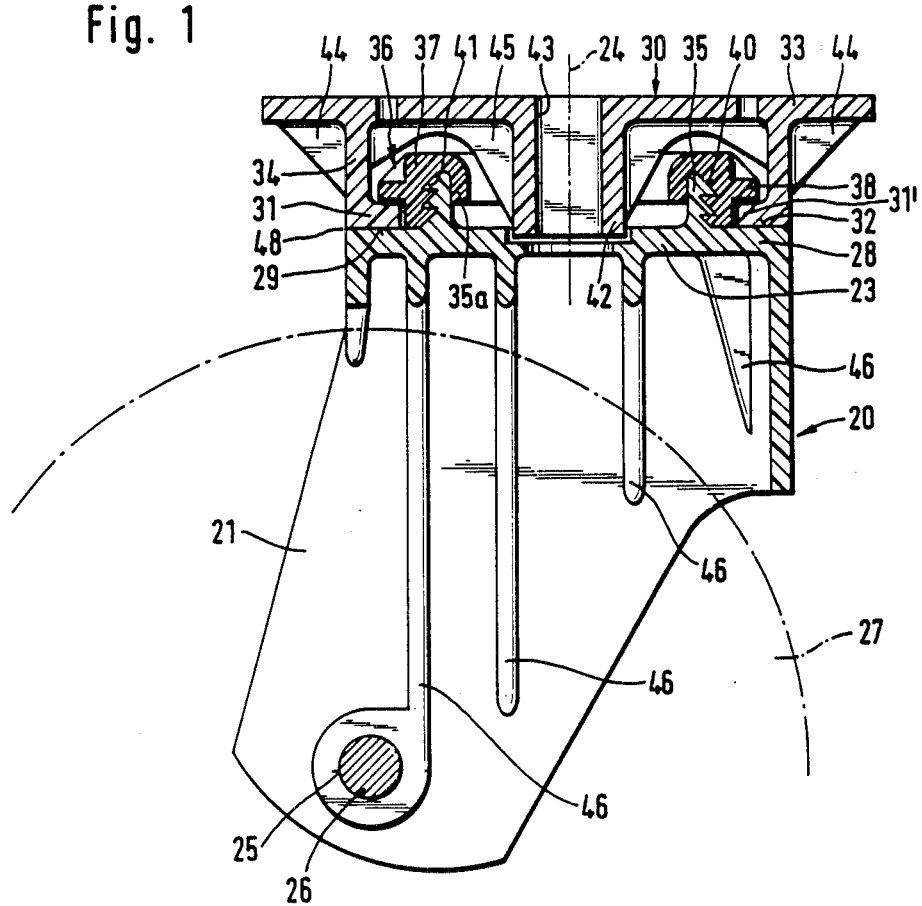
FIG. 1 is a vertical sectional view of a caster which embodies one form of the invention, a portion of the wheel being indicated by a phantom line.
Figure 2:
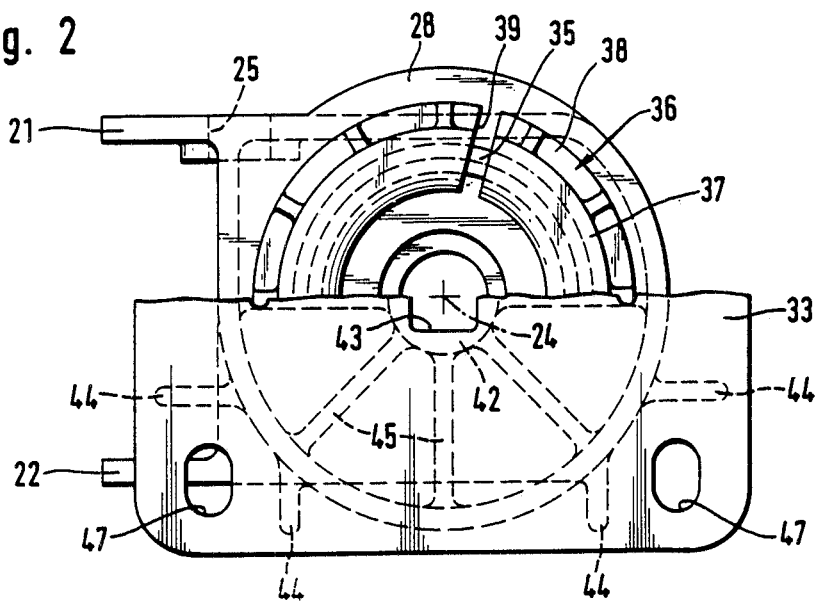
FIG. 2 is a plan view of the structure which is shown in FIG. 1, with one-half of the carrier broken away.

The caster which is shown in FIGS. 1 and 2 comprises a frame 20, a wheel 27 and a carrier 30. The frame 20 comprises two spaced apart parallel prongs or arms 21, 22 and a web 23 which is integral with the two prongs. The free end portions of the prongs 21, 22 have registering holes 25 for a shaft 26 defining an axis for rotation of the wheel 27. The frame 20 can swivel with reference to the carrier 30 about a second axis 24 which is normal to and does not intersect the axis of the shaft 26. That (connecting) portion 28 of the web 23 which is remotest from the wheel 27 has a flat surface 29 abutting against the flat surface 32 at the underside of a supporting portion 31 forming part of the carrier 30. The latter further comprises a plate-like top portion 33 which is formed with holes 47 for attachment to the leg of a piece of furniture or the like, and a cylindrical intermediate portion 34 which is integral with the portions 31 and 33. The portions 28 and 31 are annuli and the latter has a radially inwardly extending flange 31' whose underside forms part of the surface 32. The caster further comprises a coupling device 36 which secures the frame 20 to the carrier 30 in such a way that the frame can swivel about the axis 24 with reference to the carrier and/or vice versa.

The connecting portion 28 of the web 23 is formed with upwardly extending protuberances 35 which constitute male detent members and are received in the complementary sockets or female detent members 35a of a split ring 37 constituting the coupling device 36. The protuberances 35 have teeth 41 which extend into complementary internal grooves 40 of the female detent members 35a to prevent accidental separation of the ring 37 from the connecting portion 28. The ring 37 has a radially outwardly extending flange 38 which overlies the radially inwardly extending flange 31' of the supporting portion 31 so that the portions 28 and 31 are held against axial movement relative to each other. The radially extending slot 39 of the ring 37 renders it possible to impart to this ring the shape of a helix so that the ring can be threaded onto the flange 31' of the supporting portion 31 until the flange 31' is fully overlapped by the flange 38. In the next step, the protuberances 35 are pushed into the sockets of the female detent members 35a to complete the attachment of the frame 20 to the carrier 30. The portions 28 and 31 of the frame 20 and carrier 30 are the constituents of a simple but effective plain thrust bearing 48 which allows the frame and the carrier to swivel relative to each other about the axis 24 while the portions 28 and 31 are held against axial movement and away from each other by the ring 37.

The carrier 30 can be made of a single piece of a suitable synthetic plastic material, and the same applies for the frame 20 and ring 37.

The carrier 30 further comprises a hub 42 which is spacedly and concentrically surrounded by the cylindrical portion 34 and ring 37 and has a hole 43 of non-circular outline. The hole 43 can receive a component of a braking device whose construction forms no part of the present invention.

If the parts 20 and 30 are made of a synthetic plastic material, they are or can be reinforced by suitable ribs or the like. FIGS. 1 and 2 show external reinforcing ribs 44 between the plate-like portion 33 and the cylindrical portion 34 of the carrier 30, internal reinforcing ribs 45 between the portions 33, 34 and hub 42, and reinforcing ribs 46 on the prongs 21, 22 of the frame 20.

It will be seen that the plain thrust bearing 48 between the frame 20 and the carrier 30 need not include any separately machined or otherwise produced parts because one constituent of this bearing is the uppermost (connecting) portion 28 of the web 23 (which is integral with the prongs 21 and 22) and the other constituent of the bearing 48 is the connecting portion 31 which is integral with the portions 33, 34 and hub 42 of the carrier 30. Moreover, the weight of this plain thrust bearing is a small fraction of the weight of a conventional thrust bearing with one or more annuli of anti-friction rolling elements made of steel or the like and two or more tracks for such rolling elements. The reinforcing ribs 44-46 can impart to the frame 20 and carrier 30 any desired degree of rigidity and stability, and the ring 37 of the coupling device 36 ensures reliable retention of the surfaces 29 and 32 in requisite contact with each other. The common plane of these surfaces is parallel to the axis of the shaft 26 for the wheel 27.

Figure 3:
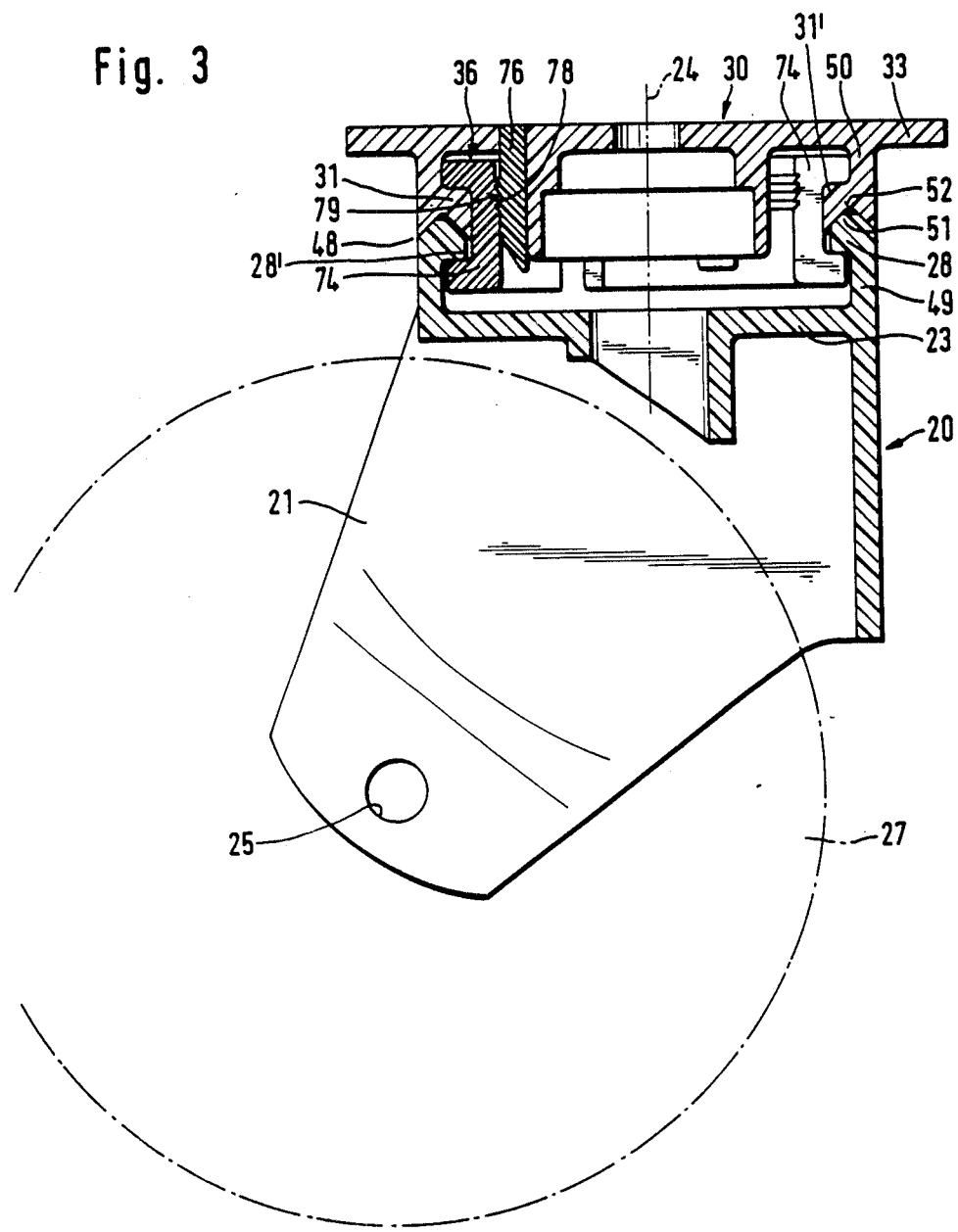
FIG. 3 is a vertical sectional view of a second caster.

FIG. 3 shows a modified caster. All such parts of this caster which are identical with or clearly analogous to the corresponding parts of the caster of FIGS. 1 and 2 are denoted by similar reference characters. The connecting portion 28 of the web 23 has an annular projection 51 which extends into a complementary groove 52 in the underside of the supporting portion 31 of the carrier 30. The surface bounding the projection 51 corresponds to the surface 29 and the surface bounding the groove 52 corresponds to the surface 32 of the caster which is shown in FIGS. 1 and 2. The connecting portion 28 is integral with a short cylinder 49 which forms part of the web 23 and is concentric with a cylinder 50 corresponding to the cylindrical intermediate portion 34 of the carrier 30 shown in FIGS. 1 and 2. The portions 28 and 31 include radially inwardly extending flanges 28' and 31' which abut against each other and are held against axial movement away from one another by a coupling device 36 of the type shown in greater detail in FIGS. 15 to 17. The annular projection 51 of the connecting portion 28 has a triangular cross-sectional outline. However, it is equally possible to provide the connecting portion 28 with a projection having a trapeziform or other polygonal outline; the groove 52 is then modified so that it can snugly receive the modified projection. The projection 51 cooperates with the grooved part of the supporting portion 31 to hold the frame 20 against movement relative to the carrier 30 and vice versa in directions at right angles to the axis 24. In other words, the caster of FIG. 3 need not be provided with any centering means for the portions 28 and 31 because the centering action is performed by the surfaces bounding the projection 51 and groove 52.

Referring to FIGS. 4 to 6, there is shown a portion of a third caster wherein the connecting portion 28 of the web 23 has a radially outwardly extending annular flange 28' defining a flat surface 29 and the supporting portion 31 has a radially outwardly extending flange 31' defining a flat surface 32 and abutting against the flange 28' of the connecting portion 28. The means for centering the portions 28 and 31 so that their axes coincide with the axis 24 includes a ring-shaped male centering element 53 on the supporting portion 31 and a complementary female centering element 54 on the connecting portion 28. The male centering element 53 is kept within the confines of the female centering element 54 by the coupling device 36 which also holds the portions 28, 31 against axial movement away from each other (as considered in the direction of the axis 24).

The flanges 28' and 31' of the portions 28 and 31 are disposed radially inwardly of the cylindrical peripheral surface 55 of the web 23 and such peripheral surface is flush or substantially flush with the peripheral surface of a composite ring constituting the coupling device 36. This ring has two semicircular sections 56 whose end faces are provided with complementary male and female securing means 57, 58 to hold the sections 56 together and to thus ensure that the circumferentially complete internal grooves between the legs of the sections 56 properly receive the flanges of the portions 28 and 31 in a manner as shown in FIG. 4. Each of the two semicircular sections 56 has a substantially U-shaped cross-sectional outline. One leg of each section 56 overlies the radially outwardly extending flange 31' of the supporting portion 31 and the other leg of each section 56 is overlapped by the radially outwardly extending flange 28' of the connecting portion 28. In the embodiment of FIGS. 4 to 6, the male securing means 57 include hammerhead-shaped projections which extend circumferentially beyond the respective end faces of the sections 56 and into the complementary sockets of the female securing means 58 to reliably hold the sections 56 in assembled condition. The material of the sections 56 is sufficiently elastic to permit penetration of the heads of male securing means 57 into the corresponding sockets.

Figure 7:
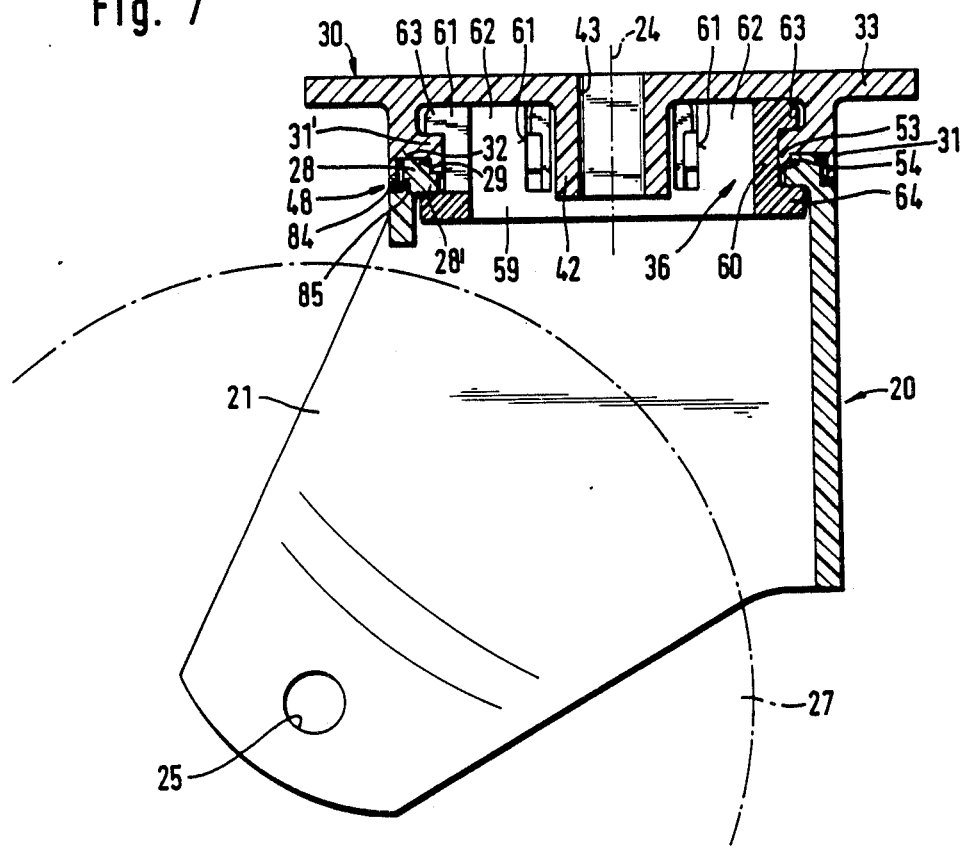
FIG. 7 is a fragmentary vertical sectional view of a fourth caster.
Figure 8:
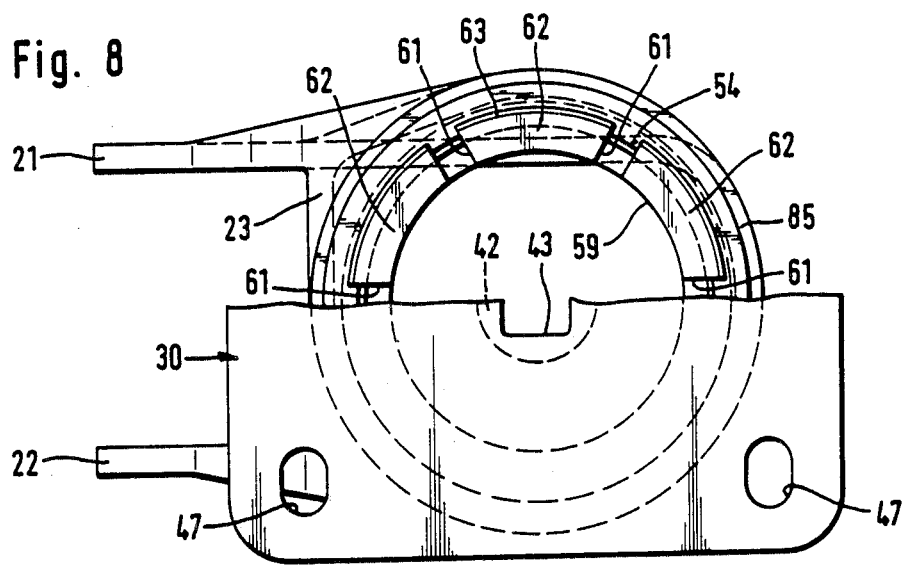
FIG. 8 is a plan view of the structure which is shown in FIG. 7, with one-half of the carrier broken away.

FIGS. 7 and 8 show a further caster wherein the connecting portion 28 of the web 23 has a radially inwardly extending annular flange 28' and the supporting portion 31 of the carrier 30 has a radially inwardly extending annular flange 31' overlying the flange 28' of the portion 28. The surfaces 29, 32 of the portions 28, 31 are disposed in a plane which is normal to the swivel axis and the portions 28, 31 are centered (by way of male and female centering elements 53, 54) in the same way as described in connection with FIGS. 4 to 6.

The coupling device 36 of FIGS. 7 and 8 comprises a ring 59 having a U-shaped cross-sectional outline and a circumferentially complete rim or bead 64 which is overlapped by the flange 28' of the connecting portion 28, a cylindrical hub 60 which is surrounded by the flanges 28', 31' of the portions 28, 31, and a second rim or bead 63 consisting of a set of arcuate segments 62 separated from each other by radial slots 61 which also extend into the hub 60. The slots 61 (which are preferably equidistant from one another, as considered in the circumferential direction of the coupling device 36) render it possible to reduce the diameter of the bead or rim 63 so that it can pass through the opening which is surrounded by the flanges 28' and 31' of the portions 28, 31 and to thereupon expand so that its segments 62 overlie the flange 31' of the portion 31 in a manner as shown in FIG. 7.

The reference character 84 denotes a cylindrical skirt which is an integral part of the supporting portion 31 and surrounds the surfaces 29, 32. This skirt is received in a peripheral recess 85 of the portion 28. The skirt 84 or an analogous barrier can also be used in other embodiments of the improved caster. The skirt 84 and the adjacent portion of the frame 20 form a labyrinth seal which prevents penetration of impurities into the plain thrust bearing including the portions 28 and 31.

Figure 9:
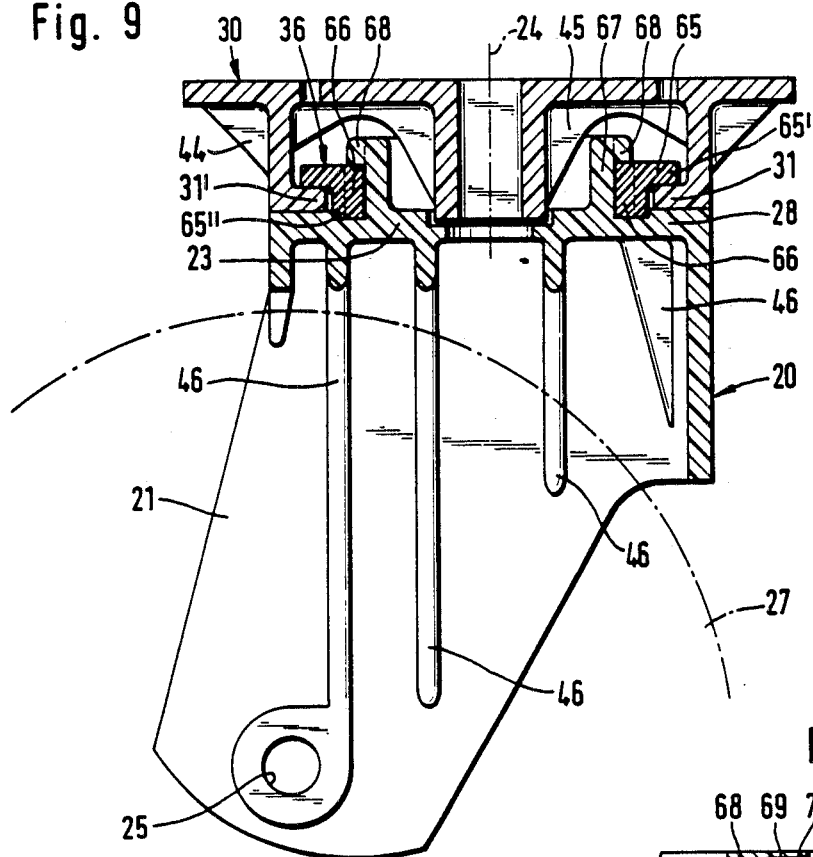
FIG. 9 is a fragmentary vertical sectional view of a fifth caster.
Figure 11:
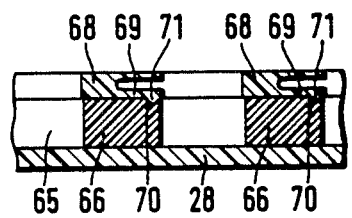
FIG. 11 is a fragmentary vertical sectional view as seen in the direction of arrows from the arcuate line XI—XI in FIG. 10.
Figure 10:
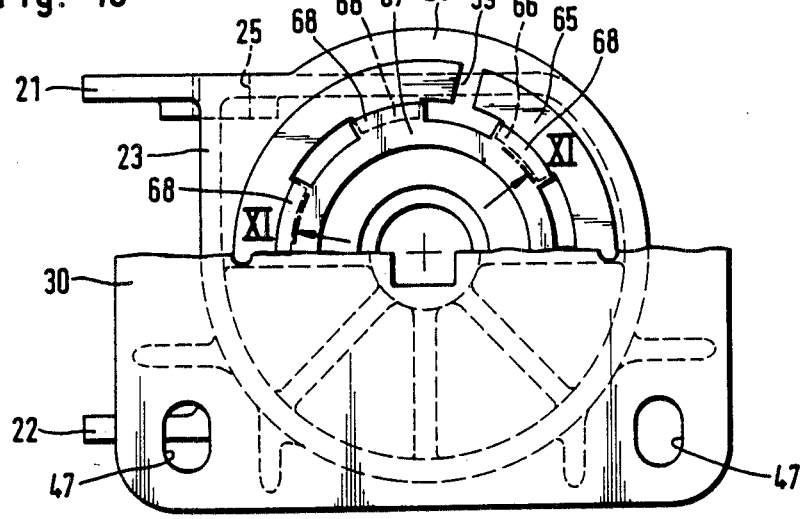
FIG. 10 is a plan view of the structure which is shown in FIG. 9, with one-half of the carrier broken away.

The caster of FIGS. 9 to 11 comprises a coupling device 36 including a ring 65 having an L-shaped cross-sectional outline with a radially outwardly extending leg 65' which overlies the radially inwardly extending flange 31' of the supporting portion 31. The cylindrical leg 65" of the ring 65 is secured to the connecting portion 28 by a bayonet mount. The bayonet mount comprises a set of annularly arranged arcuate segments 66 which extend radially inwardly from the cylindrical leg 65" of the ring 65 and a set of annularly arranged complementary segments 68 at the exterior of a cylindrical extension 67 of the connecting portion 28. The ring 65 is a split ring with a radial slot 39 which renders it possible to reduce the diameter of the radially outwardly extending leg 65' of the ring 65 and to pass it into the interior of the carrier 30 so that, when the leg 65' of the ring 65 expands, it overlies the radially inwardly extending flange 31' of the portion 31 in a manner as shown in FIG. 9. The extension 67 is then introduced into the ring 65 while its segments 68 alternate with the segments 66, and the extension 67 is then turned relative to the ring 65 so that the segments 68 engage with the segments 66 in a typical bayonet mount fashion. In order to prevent accidental disengagement of the two sets of segments 66 and 68, the segments 68 have circumferentially extending tongues or male detent members 69 with enlargements or pallets 71 which snap into complementary sockets 70 forming part of female detent members on the adjacent segments 66. This can be seen in FIG. 11.

Figure 12:
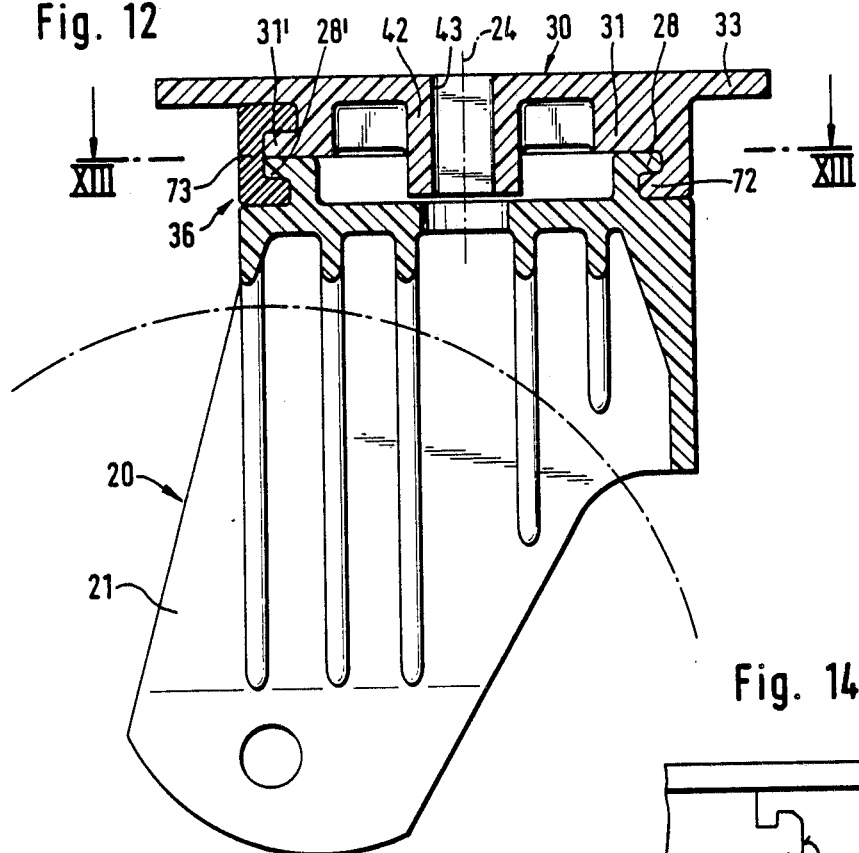
FIG. 12 is a fragmentary vertical sectional view of a sixth caster.
Figure 14:
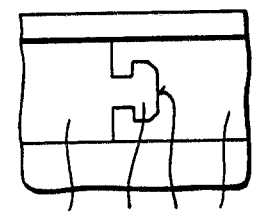
FIG. 14 illustrates a detail of the sixth caster as seen in the direction of arrow XIV in FIG. 13.
Figure 13:
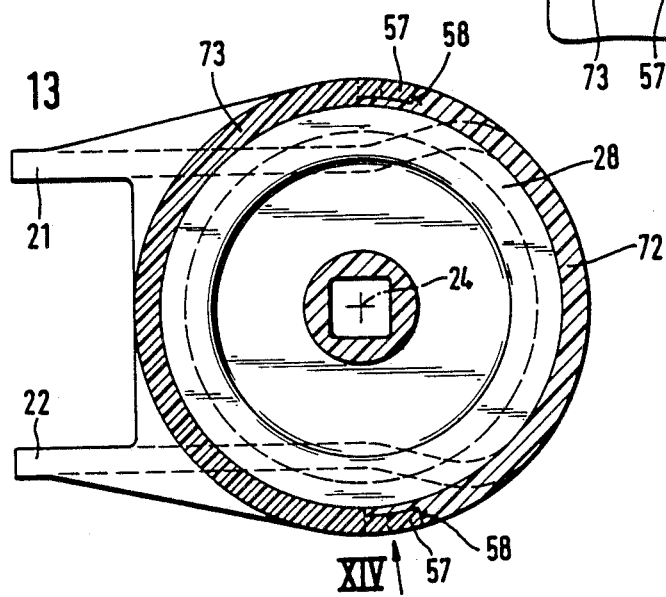
FIG. 13 is a horizontal sectional view as seen in the direction of arrows from the line XIII—XIII of FIG. 12.

The caster of FIGS. 12 to 14 has a coupling device 36 which includes a semicircular section 72 forming an integral part of the supporting portion 31 and a discrete (separately produced) semicircular section 73. The sections 72 and 73 have a substantially U-shaped cross-sectional outline and the section 73 has an upper leg which overlies a radially outwardly extending flange 31' of the supporting portion 31 as well as a lower leg which is overlapped by the radially outwardly extending annular flange 28' of the connecting portion 28. The section 72 has a lower leg which is also overlapped by the flange 28' of the portion 28. The internal groove which is defined by the two legs of the section 73 receives the corresponding parts of the flanges 28' and 31' of the portions 28 and 31 in a manner as best shown in FIG. 12. The end faces of the section 73 have circumferentially extending hammerhead-shaped male securing means 57 receivable in the sockets of female securing means 58 provided on the section 72. The heads of the securing means 57 snap into the respective sockets to thus reliably hold the section 73 on the carrier 30 and to enable the frame to swivel about the axis 24 relative to the carrier 30 and/or vice versa. The flange 31' extends along an arc of approximately 180 degrees.

Referring now to FIGS. 15, 16 and 17, there is shown a caster wherein the distance d between the axis of the shaft 26 and a plane which includes the axis 24 and is parallel to the axis of the shaft 26 is less than the mean radii r of the annular surfaces 29 and 32.

The coupling device includes a composite ring which includes several (e.g., three) arcuate sections 74 each of which has a substantially U-shaped cross-sectional outline. The plate-like top portion 33 of the carrier 30 has a downwardly extending cylindrical or tubular back support 75 for three wedges 76 which are introduced, in parallelism with the axis 24, through suitable apertures 77 in the plate-like portion 33 to bias the adjacent sections 74 radially outwardly so that the external grooves of such sections receive the adjacent parts of the radially inwardly extending flanges of the portions 28 and 31 whereby the frame 20 and the carrier 30 are held against axial movement away from one another. As can be seen in FIGS. 15 and 16, a portion of the internal surface of the cylindrical or tubular back support 75 is provided with an annulus of axially parallel teeth. Such teeth can mate with complementary teeth of a member (not shown) which serves to hold the frame 20 and carrier 30 against angular movement relative to each other.

The surfaces bounding the apertures 77 hold the wedges 76 of the biasing means 75, 76 against movement relative to the carrier 30, as considered in the circumferential direction of the supporting portion 31. In order to ensure that the properly inserted wedges 76 cannot move in parallelism with the axis 24, the outer sides of such wedges are provided with teeth 79 extending into complementary internal grooves 78 of the adjacent sections 74.

In order to enable the caster of FIGS. 15 to 17 to be equipped with a device which holds the frame 20 against angular movement about the axis 24, i.e., to prevent the wheel 27 from changing the direction of its travel along the floor if the caster is mounted on the leg of a piece of furniture, the frame 20 carries two angle pieces 80 each of which has a centrally located rectangular recess 81 for a non-illustrated blocking lever. Each of the two illustrated angle pieces 80 includes a substantially L-shaped part 82 which is partially embedded in the material of the frame 20. The parts 82 are disposed one behind the other, as considered in a plane which is normal to the axis of the shaft 26 and halves the wheel 27. If the frame 20 is made from a synthetic plastic material, the parts 82 can be partially confined in the cavity of the mold which is used for the making of the frame. The exact mode (e.g., injection or extrusion) of making the frame 20 and/or other plastic parts of the improved caster forms no part of the invention. The parts 82 can be made of a metallic material. Alternatively, such parts can constitute integral portions of a synthetic plastic frame.

The construction of the coupling device 36 in the caster of FIG. 3 is identical with that of the coupling device of the caster of FIGS. 15 to 17.

Figure 18:
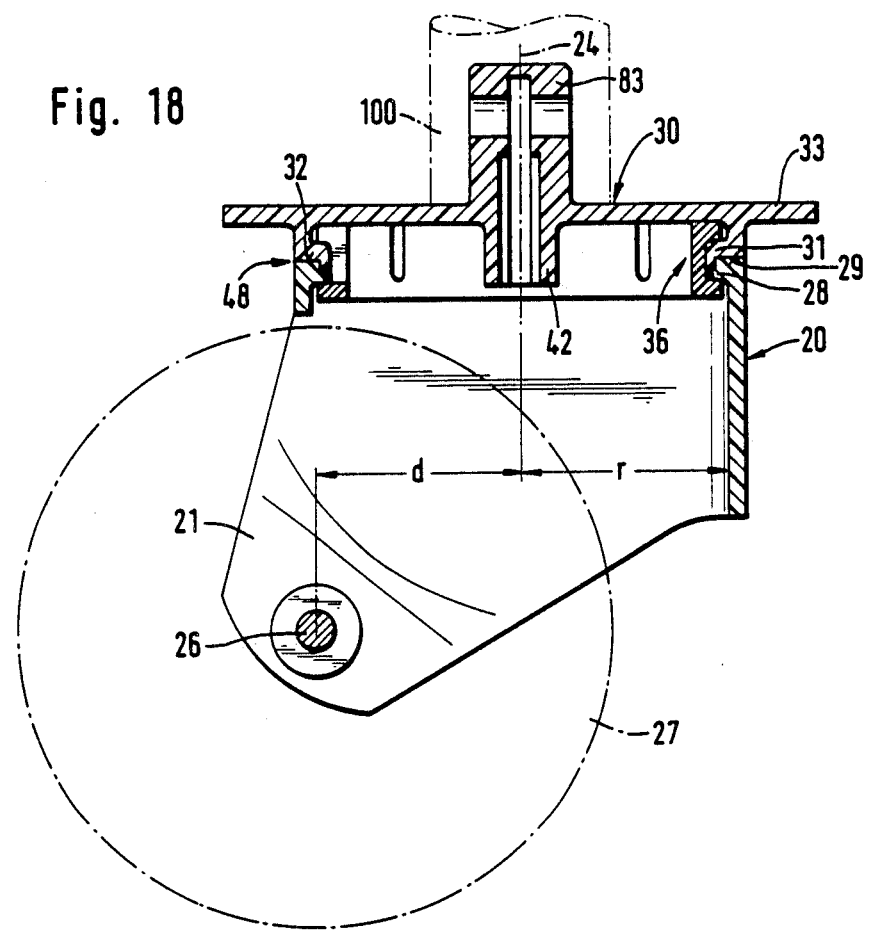
FIG. 18 is a vertical sectional view of an eighth caster.
Figure 19:
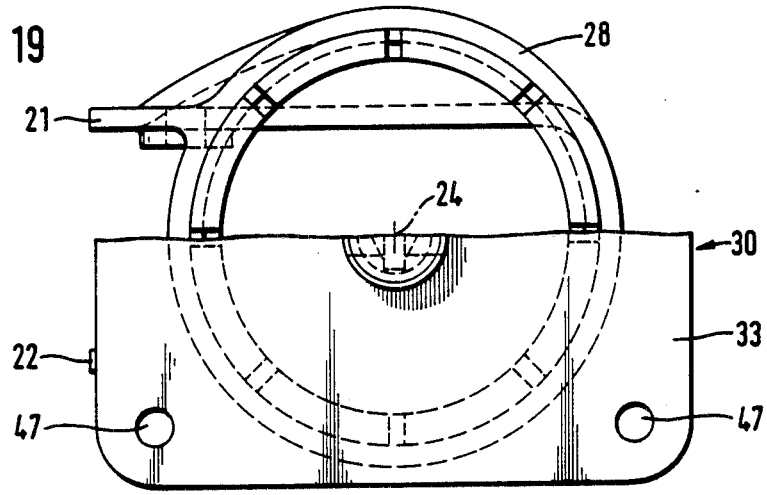
FIG. 19 is a plan view of the eighth caster, with one-half of the carrier broken away.

FIGS. 18 and 19 show a further caster which is similar to the caster of FIGS. 7 and 8. The hub 42 of the carrier 30 has an upward extension 83 receivable directly in a suitable hole or socket of a dolly, piece of furniture or the like which is to be mounted on the improved caster or casters. For example, the extension 83 of the hub 42 can be caused to snap into the lower end portion of the leg 100 of a table, chair, dolly or the like. Moreover, the interior of the extension 83 can receive one or more parts (not specifically shown) of a brake, e.g., one or more actuating elements of the brake.

In contrast to the caster of FIGS. 15 to 17, the average radii r of the annular surfaces 29 and 32 at least equal but can exceed the distance d between the axis of the shaft 26 and a plane which is parallel to such axis and includes the axis 24. Such ratio of the radii r to the distance d can be selected for each embodiment of the improved caster. An advantage of a caster wherein the radii r at least equal the distance d is that the thrust bearing is not subjected to any supporting moments. Moreover, such relationship of r to d ensures an optimum distribution of supporting forces. For this purpose the axis 24 extends through the centers of the annular surfaces 29 and 32.

The improved caster is susceptible of many additional modifications. For example, the frame 20 can be provided with a single prong (21 or 22) for the wheel 27. Furthermore, the carrier 30 can constitute an integral part of the leg 100 of a piece of furniture or the like to even further reduce the cost of the caster by eliminating the need for the making of a separate carrier. Such practice can be resorted to with particular advantage if the carrier and the part which is integral therewith consist of a synthetic plastic material which can be shaped in an injection molding, extruding or other suitable machine. Injection molding is one of the presently preferred techniques of making the components of the improved caster. The preferably plastic material of the frame 20 and carrier 30 is selected with a view to ensure that the portions 28, 31 exhibit self-lubricating and/or other desirable characteristics such as satisfactory resistance to axially oriented stresses which develop when the caster is in use and which are applied to the surface 29. The utilization of self-lubricating materials or coating of the surfaces 29, 32 with such materials is desirable and advantageous because this obviates the need for maintenance of the caster. The utilization of suitable plastic materials exhibits other important advantages, such as the absence of corrosion, so that the caster must be discarded only after extensive use and attendant wear and/or as a result of the application of excessive stresses. It has been found that the wear upon the surfaces 29, 32 of the improved thrust bearing 48 is minimal so that the bearing can stand surprisingly long periods of extensive use. Another important advantage of a predominantly or entirely plastic caster is its low weight, especially when compared with casters whose thrust bearings are made of or comprise numerous metallic parts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A caster comprising a frame including at least one prong and a connecting portion rigid with said prong; a wheel mounted on said prong for rotation about a first axis, said connecting portion having a first surface which is remote from said axis; a carrier including a supporting portion having a second surface abutting said first surface, said portions constituting annuli and having radially inwardly extending flanges; and means for coupling said supporting portion to said connecting portion for angular movement about a second axis which is normal to said first axis so that said portions form constituents of a plain thrust bearing between said frame and said carrier, said coupling means comprising a ring composed of several arcuate sections and having an external annular groove for said flanges, said coupling means further comprising means for biasing said sections radially outwardly to prevent their separation from said flanges, said biasing means comprising a back support which is rigid with one of said portions and is disposed radially inwardly of said sections, and wedges interposed between said back support and said sections to urge said sections radially outwardly.

2. The caster of claim 1, wherein said first and second surfaces are flat.

3. The caster of claim 1, wherein said wedges and the respective sections have cooperating toothed portions for preventing a movement of said wedges in the direction of said second axis.

4. The caster of claim 1, wherein said carrier forms an integral part of a portion of a mobile commodity, such as the leg of a piece of furniture.

5. The caster of claim 1, wherein a plane which includes said second axis and is parallel to said first axis is remote from said first axis and each of said surfaces is an annular surface surrounding said second axis, the distance between said plane and said first axis being at most equal to the mean radial distance between said annular surfaces and said second axis.

6. The caster of claim 1, wherein said surfaces are provided on said flanges, said coupling means further comprising means for maintaining said flanges in said groove.

* * * * *